Oct. 19, 1937.  C. T. ALTFATHER  2,096,419
SIMPLIFIED NETWORK PROTECTOR
Filed Sept. 13, 1934  2 Sheets-Sheet 1

WITNESSES:

INVENTOR
Conrad T. Altfather,
BY
ATTORNEY

Oct. 19, 1937.  C. T. ALTFATHER  2,096,419
SIMPLIFIED NETWORK PROTECTOR
Filed Sept. 13, 1934  2 Sheets-Sheet 2

WITNESSES:
C. J. Weller.
G. E. Harrison.

INVENTOR
Conrad T. Altfather.
BY
ATTORNEY

Patented Oct. 19, 1937

2,096,419

UNITED STATES PATENT OFFICE 2,096,419

SIMPLIFIED NETWORK PROTECTOR

Conrad T. Altfather, North Arlington, N. J., assignor to Westinghouse Electric & Manufacturing Company, East Pittsburgh, Pa., a corporation of Pennsylvania Application September 13, 1934, Serial No. 743,865

13 Claims. (Cl. 175—294)

My invention relates to protective apparatus for use in distribution systems, and particularly to network protectors for controlling the flow of power in alternating-current network distribution systems. In network distribution systems, a distribution network is supplied by means of a plurality of feeders each connected to the network by means of a plurality of banks of step-down transformers, and the network protectors are connected in the secondary leads of the transformers for clearing the transformers from the network in the event of a feeder fault.

In the copending application of M. A. Bostwick, Serial No. 716,819, filed March 22, 1934, and assigned to the Westinghouse Electric & Manufacturing Company, there is disclosed a simplified network protector in which means is provided for effecting closure of the network circuit breaker when the positive symmetrical components of a polyphase system of voltages, consisting of two phases derived from the source side of the network circuit breaker and one phase derived from the network, exceeds a predetermined value. The protector disclosed in the aforesaid Bostwick application is simple in construction and satisfactory in operation but requires a number of control relays for effecting the opening and closing of the network circuit breaker in response to the various voltage conditions under which a protector operation is necessary.

It is an object of my invention to provide a simplified network protector of the type disclosed in the aforesaid application of M. A. Bostwick, in which, however, the control apparatus shall be rearranged and simplified.

A further object of my invention is to provide a simplified closing relay for use in network protectors generally.

Another object of my invention is to provide a simplified protector of the type indicated above which shall require only one control relay.

Other objects of my invention will become evident from the following detailed description taken in conjunction with the accompanying drawings, in which Figure 1 is a view in perspective of the principal operating parts of a relay embodying my invention.

Figure 1:
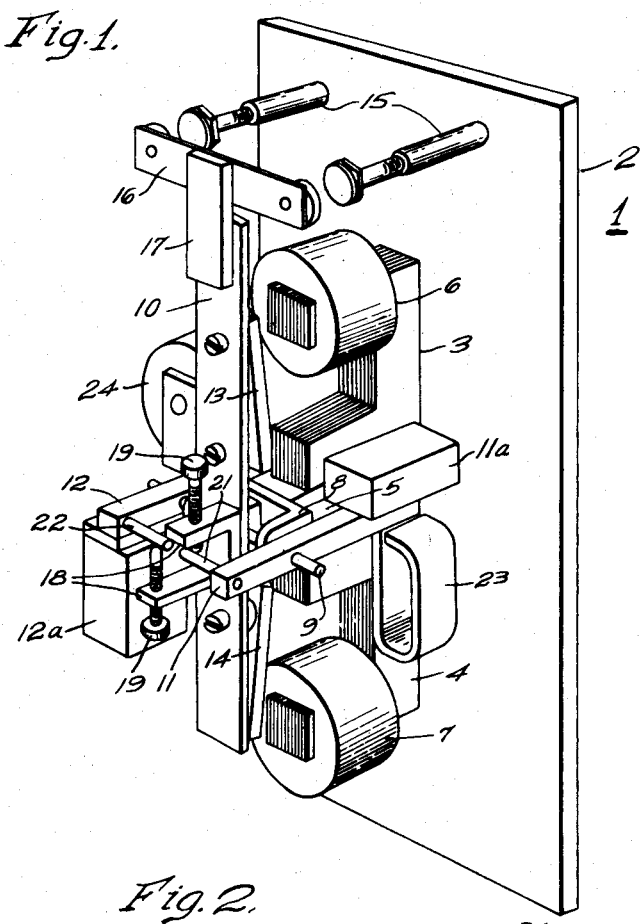

Referring to Fig. 1, in detail, the relay 1 comprises a vertical panel 2 of suitable insulating material upon which is mounted a C-shaped closing magnet 3 and a C-shaped lock-out magnet 4. The magnets 3 and 4 are preferably of laminated construction and are secured to the panel 2 by suitable means (not shown) upon either side of a post 5. A closing coil 6 and a lock-out coil 7 are provided for energizing the magnets 3 and 4 respectively.

A yoke 8 is secured to the post 5 for supporting the movable parts of the relay. The yoke 8 is drilled to receive a shaft 9 upon which a main armature 10 and a pair of auxiliary armatures 11 and 12 are mounted for independent rotation.

The main armature 10 is provided with a pair of laminated armature assemblies 13 and 14, positioned to cooperate with the magnet assemblies 3 and 4 respectively. The air-gaps of the magnetic circuits are so related that when the main armature 10 stands in its neutral position, as shown, neither of the magnetic circuits of the magnets 3 or 4 is completed. The main armature 10, however, may rotate into a contact-closing position in which the air-gap between the magnet 3 and its associated armature 13 is considerably reduced, or may rotate backward to a lockout position in which the magnet 4 engages its armature 14 to form a closed magnetic circuit.

The contact members of the relay 1 comprise a pair of stationary adjustable contact posts 15, secured to the panel 2, and a metallic strip 16 provided with suitable contact tips, secured to the main armature 10 by means of a strip of insulating material 17 and suitable fastening members (not shown).

The main armature 10 is provided with a pair of L-shaped brackets 18 secured near its center in opposed relationship. The brackets 18 are provided as supports for a pair of stop-screws 19 which cooperate with pins 21 and 22 carried by the auxiliary armatures 11 and 12 respectively.

The auxiliary armature 11 is of magnetic material and is provided with a weight 11a which normally maintains it in a seal-in position against the poles of a permanent magnet 23, secured to the panel 1. The auxiliary armature 12 is also of magnetic material and is similarly biased into a sealed-in position against the poles of an electromagnet 24, by means of a weight 12a. The electromagnet 24 is positioned above the shaft 9 with its pole-tips extending downward, so as to be engaged by the auxiliary armature 12 when the latter is approximately horizontal.

The stop-screws 19 permit the main armature 10 to have an adjustable amount of play or lost-motion about its neutral position before either of the pins 21 or 22 is engaged by the corresponding stop-screw 19. However, beyond this range of lost motion, the main armature 10 can only be moved to lock-out position by a torque sufficient to break the seal of the permanent magnet 23 and overcome the bias of the weight 11a. Similarly, the main armature 10 can only be moved to closing position by a torque sufficient to break the seal of the electromagnet 24 and overcome the bias of the weight 12a. The stop-screws provide independent adjustments of the air-gaps of magnets 3 and 4 effective at the positions of the main armature 10 at which the corresponding magnetic seal must be broken to move the main armature 10 into closing or lock-out position respectively.

Figure 2:
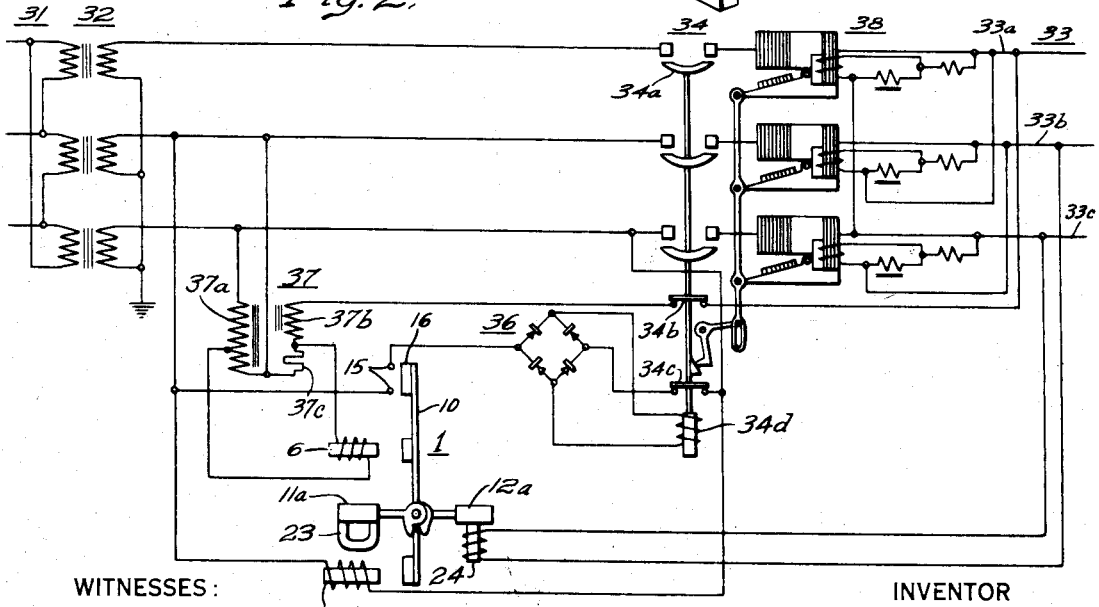
Figs. 2 and 3 are diagrammatic views of network protectors embodying my invention.

The operation of the relay 1 may best be described in connection with a network system as shown fragmentarily in Fig. 2. Referring to Fig. 2, a feeder 31 is connected to the primary windings of bank of step-down transformers 32 for supplying power to an alternating-current network 33. The transformers 32 are preferably connected in delta on the high-voltage side and in star with neutral grounded on the low-voltage side, but may be connected in other ways known in the art. A network circuit breaker 34 is interposed in the secondary leads of the transformers 32 for controlling the power flow therethrough. Although only one feeder 31 and transformer bank 32 are shown, it will be understood that the network 33 is supplied by means of other feeders, and that a plurality of banks of transformers or polyphase transformers are connected between each feeder and the network 33.

The circuit breaker 34 is provided with the usual main contact members 34a and with auxiliary back contact members 34b and 34c, and a suitable electromagnetic closing element, shown as a solenoid 34d. The closing solenoid 34d is connected in a closing circuit to be controlled by the network relay 1. A set of rectifiers 36 is preferably included in the closing circuit, but may be omitted if the solenoid 34d or equivalent closing element is designed for alternating-current energization.

The relay 1 is shown diagrammatically in Fig. 2 as comprising the closing coil 6, lockout coil 7, weights 11a and 12a, permanent magnet 23 and electromagnet 24. It will be understood, however, that the preferred construction of this relay is as described in connection with Fig. 1. The lockout coil 7 is connected to be energized from the secondary circuit of transformer 32, preferably from the b- and c-phase secondary terminals as shown. The electromagnet 24 is energized from the network 33, preferably also from the b- and c-phase secondary terminals as shown.

The closing coil 6 is connected to a positive phase sequence filter 37 to be energized in accordance with the positive symmetrical components of a polyphase system of voltages consisting of two phases of the secondary voltage of the transformer bank 32 and one phase of the voltage of the network 33. It will be understood that the phase voltages of the network 33 are referred to ground through the neutral ground connection of other transformer banks similar to the bank 32, when the network 33 is energized.

The positive phase sequence filter 37 is preferably of the type disclosed in U. S. patent to B. E. Lenehan No. 1,936,797, assigned to the Westinghouse Electric & Manufacturing Company. This filter comprises an autotransformer 37a having a 40% tap and an impedance consisting of a reactor 37b and resistor 37c having their constants so related that the voltage drop across the resistor 37c is equal to 40% of the total voltage impressed on the reactor 37b and resistor 37c in series, but lags the total voltage by a phase angle of 60°. Assuming the phase sequence of voltages applied to the filter to be as indicated by the subscripts a, b, and c of the network conductors 33a, 33b and 33c, the voltage applied to the closing coil 6 is proportional to the positive symmetrical component of the poly-phase voltage applied to the filter terminals, as explained in the above-mentioned patent to B. E. Lenehan.

The relay 1 is designed and adjusted as follows: When the coils 6 and 7 and the electromagnet 24 are all deenergized, the torques exerted by the weights 11a and 12a are sufficient to rotate the relay armature to the neutral position, as shown, in which the magnetic armatures associated with the permanent magnet 23 and electromagnet 24 are both in sealed-in position.

As one phase of the phase-sequence filter 37 is energized from the network 33 by means of a connection which includes the back contact members 34b of circuit breaker 34, the degree of energization of the closing coil 6 depends upon both the voltage of the network 33 and the open or closed condition of the circuit breaker 34. The maximum energization of the closing coil 6 occurs when the circuit breaker 34 is open, the secondary voltages of the transformer bank 32 are of normal value, and the a-phase voltage of the network 33 is of normal value and displaced in phase by 120° from the b- and c-phase secondary voltages of the transformers 32. Under these conditions, the closing torque exerted by the closing coil 6 is of maximum value which will be assumed as 100%.

When the circuit breaker 34 is closed, one phase connection of the filter 37 is interrupted, and the closing torque exerted by the closing coil 6 is of a considerably lower value, which will be assumed as 50%. Similarly, when the circuit breaker 34 is open, and the transformers 32 are energized but the network 33 is deenergized, the closing coil 6 exerts its lower or 50% value of torque, as no voltage is applied to the network phase of the filter 37 under these conditions.

The air-gaps of the relay 1 are adjusted so that when the relay armature is in neutral position as shown, the electromagnet 24 is deenergized and the transformers 32 are energized, the sum of the opening torques exerted by the lock-out coil 7 and weight 12a is slightly less than the lower or 50% value of closing torque which may be exerted by the closing coil 6. For example, the total opening torque exerted by the lockout coil 7 and weight 12a under these conditions may be 45% of the maximum closing torque exerted by the closing coil 6. The excess of torque exerted by the closing coil 6 over that exerted by the lockout coil 7 and weight 12a is therefore at least 5% when the transformers 32 are energized and the relay armature is in neutral position.

When the relay armature is in contact-closing position, the lower value of torque exerted by the closing coil 6 exceeds the torque of the lock-out coil 7 by a somewhat larger margin such as 10% of the maximum torque of the closing coil 6, because of the decrease of air gap of the magnetic circuit of the closing coil 6 and the increase of air gap of the magnetic circuit of the lockout coil 7. When the relay armature is in lockout position, however, the magnetic circuit of the lockout coil 7 is sealed, and the torque exerted by the lockout coil 7 is sufficient to hold the relay armature in such position as long as the secondary voltage of the transformer bank 32 exceeds a predetermined low value such as 10% of normal.

The electromagnet 24 is designed to exert a restraining torque, of the order of 40% of the maximum closing torque of the closing coil 6, when the relay armature is in neutral position. When the relay armature is in contact-closing position, the electromagnet 24 exerts a somewhat lower opening torque, for example, 20% of the maximum torque of the closing coil 6. The impulse which may be imparted to the relay armature by the electromagnet 24 during movement of the relay armature from contact-closing position to neutral position is sufficient to break the seal of the permanent magnet 23 and carry the relay armature past dead center into its lockout position.

A suitable element for detecting faults on the feeder 31 is provided for tripping the circuit breaker 34 in the event of a feeder fault. In the arrangement shown, the fault responsive element is a polyphase power directional direct-trip device 38 of the type disclosed in the copending application of M. A. Bostwick, Serial No. 736,022 filed July 19, 1934, and assigned to the Westinghouse Electric & Manufacturing Company. As the construction of this device forms no part of the present invention, a detailed description thereof is omitted. It will be understood, however, that the device 38 operates in response to power flow from the network 33 to the feeder 31, and it will be assumed that the device is set to operate at a reversed power value approximately equal to the rating of the transformer bank 32.

The operation of the apparatus shown in Fig. 2 may be set forth as follows: It is assumed that initially the feeder 31 and the network 33 are deenergized, and the various elements of the protector are in the position shown in Fig. 2. If the feeder 31 is energized, the transformer bank 32 develops a secondary voltage which is applied to two terminals of the phase-sequence filter 37. As the network 33 is deenergized, no voltage is applied to the remaining terminals of the filter 37 nor to the electromagnet 24. The closing coil 6 accordingly exerts a closing torque of 50% of maximum which is opposed by a total torque of 45% produced by the lockout coil 7 and weight 12a together.

The relay 1 therefore closes to complete a closing circuit for the circuit breaker 34. This circuit may be traced from the b-phase secondary terminal of transformer bank 32, through the contact members of relay 1, rectifier 36, the closing solenoid 34d through the rectifier 36 and back auxiliary contact members 34b to the c-phase secondary terminal of the transformer bank 32.

In response to completion of its closing circuit, the circuit breaker 34 closes and thereby energizes the network 33; interrupts its own closing circuit at contact members 34c; and also interrupts the a-phase connection of the phase-sequence filter 37 at contact members 34b. The energization of closing coil 6 accordingly remains at its lower value. However, as the armature of relay 1 is now in contact-closing position, the torque exerted by the closing coil 6 exceeds the sum of torques exerted by the lockout coil 7 and weight 12a by approximately 10% of the maximum value mentioned above. As the network 33 is energized, the electromagnet 24 exerts an opening torque of 20%. The resultant of all torques acting on the relay armature is accordingly an opening torque of 10% and the relay armature rotates toward neutral position, receiving an impulse from the electromagnet 24 sufficient to carry it to lockout position where it is held by the lockout coil 7.

If a fault occurs on the network 33 the power flow in the main circuit remains in the normal direction, i. e., from left to right in Fig. 2, and the direct-trip device 38 accordingly does not operate. The fault is burned off in the usual manner, the full capacity of transformer bank 32 and other transformer banks connected to the network 33 being available to supply a sufficiently large fault current.

If a fault occurs on the feeder 31, the direction of power flow through the network protector reverses, and power is supplied from the network 33 through the circuit breaker 34 and transformer bank 32 to the fault. The magnitude of the reverse current flow may be of the order of 5 to 20 times rated full load current of the transformer bank 32. Under these conditions the voltage on the low-voltage side of the transformer bank 32 will fall somewhat, but because of the comparatively large impedance of the transformer bank 32 as compared with the network and feeder cables, the voltage cannot fall to a value approaching the 10% release value of the lock-out coil 7. The closing relay 1 accordingly remains in its lockout position.

In response to the reverse power flow, the direct-trip device 38 operates to trip open the circuit breaker 34. As the relay 1 is in lockout position, it cannot reclose until the voltage of feeder 31 falls to a value below 10% of normal. When all other network protectors connected to feeder 31 have opened, and the feeder circuit breaker (not shown) has opened, the feeder voltage falls to zero and the lock-out coil 7 of the relay 1 releases the relay armature. The weight 11a acts to restore the armature of relay 1 to neutral position.

Assuming that the network 33 remains energized from other feeders (not shown) the electromagnet 24 exerts an opening torque on the armature of the relay 1, having a magnitude of approximately 40% of the maximum torque of the closing coil 6. When the feeder fault has been repaired and the voltage of feeder 31 restored, the closing coil 6 and lockout coil 7 again exert opposing torques. The total torque opposing closure of the relay 1 under these conditions consists of 45% furnished by the lock-out coil 7 and weight 12a together, and 40% furnished by the electromagnet 24, or a total of 85% of the maximum torque which can be developed by the closing coil 6.

Before the circuit breaker 34 can be closed with the network 33 energized, therefore, it is necessary that the positive symmetrical components of voltage applied to the input terminals of the phase-sequence filter 37 exceed a value of approximately 85% of normal. This condition can occur only if the connections of feeder 31 have been correctly established in repairing the feeder fault, the magnitudes of all phases of feeder voltage and the a-phase network voltage are approximately normal, and the phase relationship of the a-phase network voltage is approximately correct as compared to the b- and c-phase secondary voltages of the transformer bank 32. Assuming that these conditions are met, the relay 1 again closes to effect closure of the circuit breaker 34.

Figure 3:
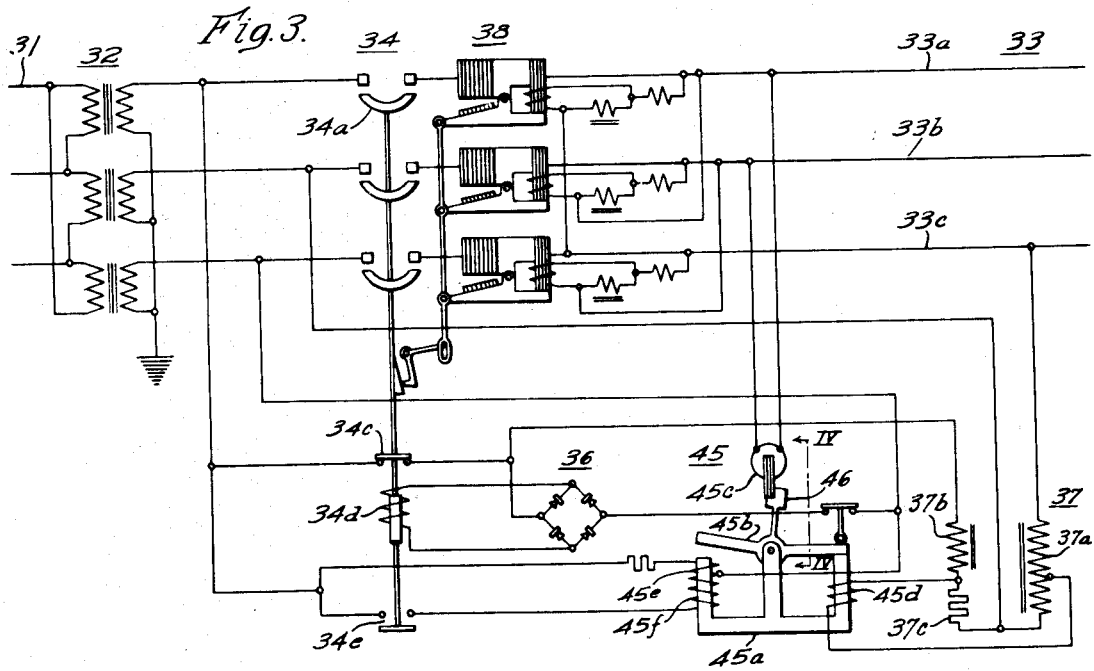

Fig. 3 shows a modified form of my invention in which a closing relay 45 of different type from the relay 1 of Fig. 1 is employed. In Fig. 3, the feeder 31, transformer bank 32, network 33 and direct trip device 38 are similar to the corresponding elements of Fig. 2 and arranged in the same manner. The circuit breaker 34 is provided with a set of auxiliary front contact members 34e in place of the back contact members 34b of Fig. 2. The phase-sequence filter 37 is similar to the corresponding filter of Fig. 2 but has its c-phase terminal connected directly to the network 33 and its a- and b-phase terminals connected to corresponding secondary terminals of the transformer bank 32. The auxiliary back contact members 34c of the circuit breaker 34 are included in series with the a-phase connection of the filter 37.

The closing relay 45, shown in Fig. 3, consists of an E-shaped magnetic core member 45a and a pivoted magnetic armature 45b operable to complete either magnetic circuit formed by the outer legs of the E-shaped core 45a. The armature 45b may also be centered in a position in which neither magnetic circuit is completed, by means of a stationary C-shaped magnet 45c energized from the network 3, and a vane 46 of magnetic material secured to the armature 45b.

The E-shaped core 45a is provided with a closing coil 45d and with a lock-out coil 45e which latter is effective to hold the armature 45b in a lockout position, but is of insufficient magnetomotive force to move the armature 45b to the lockout position. A coil 45f, of greater magnetomotive force than the coil 45e is mounted on the same magnetic circuit as the latter, for moving the armature 45b to its lockout position. The coil 45f is arranged to be controlled by the auxiliary front contact members 34e of the circuit breaker 4. The coil 45e is directly connected to the conductors of the main circuit on the feeder side of circuit breaker 34.

The relay 45 is so designed that when the magnet 45c is energized, the armature 45b stands in such a position that the magnetomotive force exerted by the closing coil 45d, necessary to effect closure of the relay contact members, must correspond to a positive phase-sequence voltage of at least 85% of normal applied voltage to the phase-sequence filter 37. When one phase-connection of the filter 37 is open, as will be the case when the circuit breaker 34 is closed, the magnetomotive force exerted by the coil 45d falls to approximately 50% of its maximum. The magnetomotive force exerted by the coils 45e and 45f together is sufficient to rotate the armature 45b to lockout position from its contact-closing position when the closing coil 45d is energized at its 50% value. The armature 45b is normally biased to contact-closing position.

In the Fig. 3 modification, the relay 45 is biased to closed position when the network 33 is deenergized, and the circuit breaker 34 therefore closes as soon as the feeder 31 becomes energized. When the network 33 is energized the armature 45a is biased to its central position by the action of the C-shaped magnet 45c and the vane 46. Reclosure then takes place when the positive symmetrical components of voltage applied to the filter 37 exceed 85% of normal value, as in Fig. 2. Upon closure of the circuit breaker 34, the coil 45f is energized and the relay 45 operates to lockout position. The operation of the Fig. 3 arrangement is otherwise the same as that of Fig. 2.

Figure 4:
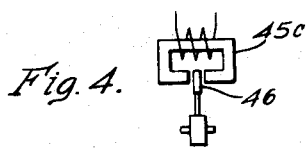
Fig. 4 is a diagrammatic detail sectional view taken on the line IV—IV of Fig. 3.

Fig. 4 shows, diagrammatically, the C-shaped magnet 45c and vane 46 as seen in elevation along the line IV—IV of Fig. 3.

Figure 5:
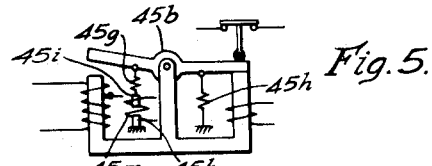
Fig. 5 is a diagrammatic view of a modification of the network relay used in the protector of Fig. 1.

Fig. 5 shows a modification of the network relay 45 of Fig. 4. Referring to Fig. 5, in place of the C-shaped magnet 45c, a pair of centering springs 45g and 45h are provided. The centering spring 45h is connected to the armature 45b and to any suitable fixed part of the relay in such manner that it always operates to bias the armature 45b towards its closed position. The centering spring 45g, however, is attached at one end to the armature 45b and at the other end to a free magnetic member 45i which is located in a position to be magnetically attracted to a stationary magnetic member 45k when a coil 45m is energized. The coil 45m is energized from the network 33 in the same manner as coil 45c of Fig. 3. The operation of this arrangement will be obvious from that described above.

Figure 6:
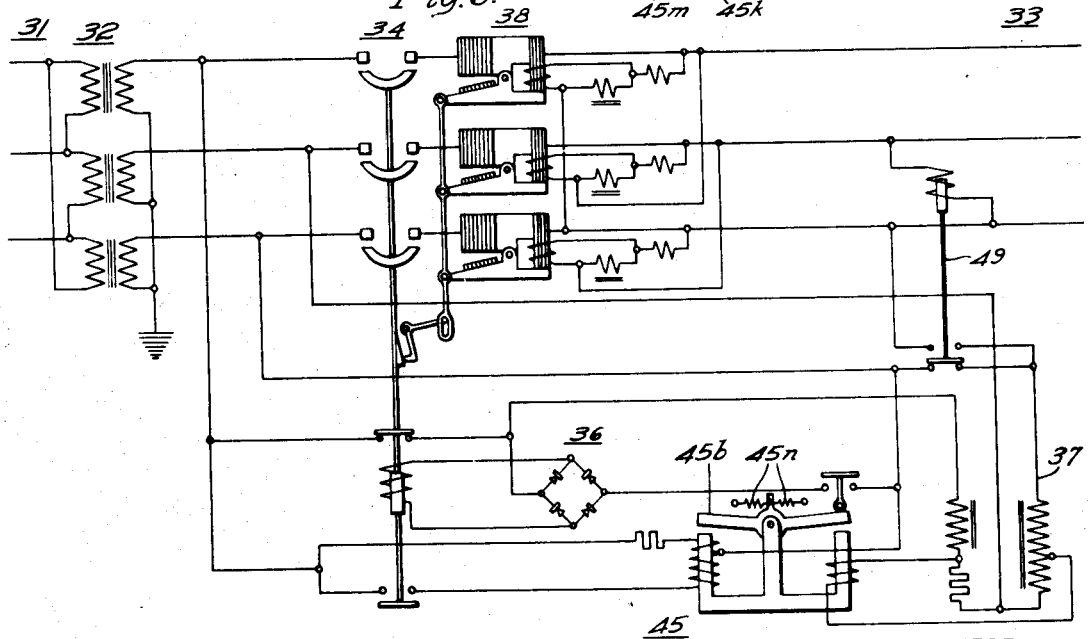
Fig. 6 is a diagrammatic view of a modification of the network protector shown in Fig. 1.

Referring to Fig. 6, which shows a modified form of the protector shown in Fig. 3, the various elements are denoted by the same reference numerals as the corresponding elements of Fig. 3. In the Figure 6 modification, the armature of the relay 45 is biased to its intermediate position by means of a pair of centering springs 45n, and no direct provision is made for closing the relay contacts when the network 33 is deenergized. A transfer relay 49, however, is provided for transferring the c-phase connection of the phase sequence filter 37 from the network side of the circuit breaker 34 to the feeder side, when the network 33 is deenergized. In this arrangement, accordingly, the network relay 45 is closed when the network 33 is deenergized, only if the positive symmetrical components of the secondary voltage of the transformers exceed the value of 85% normal. The operation of this arrangement is otherwise the same as that of the arrangement shown in Fig. 3.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In apparatus for controlling the flow of power in an electric circuit between a source of energy and a load, a circuit interrupter in said circuit, and control apparatus for said interrupter including an electroresponsive device and means for simultaneously subjecting it to a first effect dependent upon a predetermined voltage condition of said circuit and a second opposing effect dependent upon a voltage condition derived from the source side of said circuit, means controlled by said device for effecting a circuit-closing operation of said interrupter in response to an excess of said first effect over said second effect, and means automatically rendered effective in response to operation of said device for causing said second effect to exceed said first effect until said circuit is substantially deenergized.

2. In apparatus for controlling the flow of power in an electric circuit between a source of energy and a load, a circuit interrupter in said circuit, and control apparatus for said interrupter including a device having a movable armature and means for simultaneously subjecting it to a first force dependent upon a predetermined voltage condition of said circuit and a second opposing force dependent upon a voltage derived from the source side of said circuit, means controlled by said device for effecting a circuit closing operation of said interrupter in response to an excess of said first force over said second force, and means automatically rendered effective in response to operation of said device for causing said second force to exceed said first force until said circuit is substantially deenergized.

3. In apparatus for controlling the flow of power in an electric circuit between a source and a load, a circuit breaker having main contact members and auxiliary contact members operable during a closing operation of said main contact members, control apparatus for said circuit breaker including an electro-responsive device and means for simultaneously subjecting said device to a first effect dependent upon a predetermined normal voltage condition of said circuit and a second opposing effect dependent upon a voltage condition derived from the source side of said circuit, means controlled by said device for causing said circuit breaker to close in response to an excess of said first effect over said second effect and means controlled by said auxiliary contact members for causing said second effect to exceed said first effect after closure of said main contact members until said circuit is substantially deenergized.

4. In a network protector for controlling the flow of power in an alternating-current circuit between a feeder and a network, a circuit-interrupter included in said circuit, and control apparatus for said interrupter including an electromagnetic device having coil means, means for energizing said coil means from the feeder and network sides of said interrupter, a magnetic structure for said device inductively associated with said coil means, said magnetic structure including a movable member operable in response to the energization of said coil means to a first position to establish suitable reluctance conditions for response of said device to voltage conditions derived from the network and feeder sides of said circuit, to a closing position for effecting a circuit-closing operation of said interrupter, and to a lockout position for preventing operation of said device except when said feeder has been energized following a loss of voltage thereof.

5. In a network protector for controlling the flow of power in an alternating-current circuit between a feeder and a network, a circuit interrupter included in said circuit, and control apparatus for said interrupter including an electromagnetic device having a plurality of windings and a magnetic structure including an armature inductively associated with said windings, means for energizing said windings from the feeder and network sides of said interrupter to move said armature to a first position to establish suitable reluctance conditions for response of said device to voltage conditions derived from the network and feeder sides of said circuit and to a closing position for effecting a circuit closing operation of said interrupter, said device including lockout means for preventing movement of said movable member to said closing position except when said feeder has been energized following a loss of voltage thereof.

6. In a network protector for controlling the flow of power in an alternating current circuit between a feeder and a network, a circuit interrupter included in said circuit, and control apparatus for said interrupter including a control device having a movable member operable to a closing position and to another position, and operating means for said member including electromagnetic means and means for energizing it in accordance with an electrical condition of the network for varying the bias upon said movable member in accordance with the condition of energization of the network, said device including lockout means for preventing movement of said movable member to said closing position except when said feeder has been energized following a loss of voltage thereof, and means for controlling said lockout means in accordance with the voltage on said feeder.

7. In a network protector for controlling the flow of power in an alternating-current circuit between a feeder and a network, a circuit interrupter included in said circuit, and control apparatus for said interrupter including an electromagnetic device having coil means, means for energizing said coil means from the feeder and network sides of said interrupter, a magnetic circuit for said device inductively associated with said coil means including a movable member operable in response to energerziation of said coil means to a first position to establish suitable reluctance conditions for response of said device to voltage conditions derived from the network and feeder sides of said circuit, to a closing position for effecting a circuit-closing operation of said interrupter, and to a lockout position for preventing operation of said device except when said feeder has been energized following a loss of voltage thereof, and electromagnetic means for varying a bias condition of said member in dependence upon the condition of energization of the network.

8. In a network protector for controlling the flow of power in an alternating-current circuit between a feeder and a network, a network circuit breaker included in said circuit, said circuit breaker having an electromagnetic closing element and auxiliary contact members, and control means for said circuit breaker including a closing circuit for energizing said closing element, a network relay having an armature operable from a lockout position to a closing position to effect energization of said closing circuit, means including a holding coil energized from the source side of said alternating-current circuit for holding said armature in said lockout position, and means controlled by said auxiliary contact members for moving said armature to said lockout position upon a closure of said circuit breaker.

9. In a network distribution system, a network circuit breaker for controlling the connection of a polyphase alternating-current supply circuit and a polyphase alternating-current network circuit, and control means for said circuit breaker including a voltage-responsive device and means for energizing it in accordance with a resultant condition of a polyphase system of voltages consisting of at least one voltage derived from said supply circuit and at least one voltage derived from said network circuit for effecting closure of said circuit breaker when said resultant exceeds a predetermined value, said control means including means effective when said supply circuit is energized and said network is deenergized for effecting closure of said circuit breaker whether or not said resultant condition exceeds said predetermined value.

10. In a network distribution system, a network circuit breaker for controlling the connection of a polyphase alternating-current supply circuit and a polyphase alternating-current network circuit, and control means for said circuit breaker including a voltage-responsive device and means for energizing it in accordance with the positive symmetrical components of a polyphase system of voltages consisting of at least one voltage derived from said supply circuit and at least one voltage derived from said network circuit for effecting closure of said circuit breaker when said positive components exceed a predetermined value, said control means including means effective when said supply circuit is energized and said network circuit is deenergized for effecting operation of said voltage-responsive device whether or not said positive symmetrical components exceed said predetermined value.

11. In circuit breaker apparatus for controlling the flow of power in an electric circuit between a source and a load, main contact members included in said circuit and means for closing them, auxiliary contact members operated by the closing operation of said main contact members, and control apparatus including an electrical device and means for energizing it to operate said main contact closing means in response to a predetermined normal voltage condition of said circuit, said device having lockout means effective when energized to prevent reclosure of said main contact members and means for energizing said lockout means in accordance with a predetermined condition of said circuit, the energizing means for said device including electrical connections controlled by said auxiliary contact members for energizing said lockout means from the source side of said circuit during a closed condition of said main contact members.

12. In a network protector for controlling the flow of power in an alternating-current circuit between a source and a network, a network circuit breaker included in said circuit, said circuit breaker having an electromagnetic closing element and auxiliary contact members operable during a closing operation, and control means including an electrical device responsive to a predetermined normal voltage condition of said circuit for effecting energization of said closing element, said device having lockout means effective under predetermined conditions when energized to prevent energization of said closing element, and means for energizing said device from said circuit including electrical connections controlled by said auxiliary contact members for energizing said lockout means from the source side of said circuit during a closed condition of said circuit breaker.

13. In a network protector for controlling the flow of power in an alternating-current circuit between a source and a network, main contact members included in said circuit, auxiliary contact members operable during a closing operation of said main contact members, and control apparatus including an electrical device responsive to a predetermined normal relationship of voltages derived from the source and network sides of said circuit for effecting closure of said main contact members, said device having lockout means effective under predetermined conditions when energized to prevent reclosure of said main contact members, and means for energizing said device including electrical connections controlled by said auxiliary contact members for energizing said lockout means from the source side of said circuit during a closed condition of said main contact members.

CONRAD T. ALTFATHER.